United States Patent [19]
Freadman

[11] Patent Number: 6,167,116
[45] Date of Patent: *Dec. 26, 2000

[54] COMPUTER COMMUNICATIONS DEVICE

[75] Inventor: Tommyca Freadman, Goshen, N.Y.

[73] Assignee: Alteclansing Technologies, Inc., Milford, Pa.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/075,361

[22] Filed: May 7, 1998

Related U.S. Application Data

[62] Division of application No. 08/928,890, Sep. 12, 1997, Pat. No. 5,787,152, which is a continuation of application No. 08/503,590, Jul. 18, 1995, abandoned.

[51] Int. Cl.⁷ ........................................ H04M 1/64
[52] U.S. Cl. ............................. 379/88.01; 379/387
[58] Field of Search ............................. 379/67.1, 88.01, 379/88.03, 88.16, 88.23, 90.01, 93.05, 102.01, 110.01, 339, 353, 387, 441, 442, 443, 444, 52; 704/270, 271, 272, 275; 455/73, 465

[56] References Cited

U.S. PATENT DOCUMENTS

| | | |
|---|---|---|
| 4,356,509 | 10/1982 | Skerlos et al. ..................... 358/85 |
| 4,392,022 | 7/1983 | Carlson ............................. 379/102 |
| 4,427,847 | 1/1984 | Hofmann et al. ................. 379/67.1 |
| 4,991,197 | 2/1991 | Morris ............................... 379/58 |
| 5,031,205 | 7/1991 | Phillips ............................. 379/88 |
| 5,287,119 | 2/1994 | Drumm ............................. 345/158 |
| 5,375,165 | 12/1994 | Haber et al. ................... 379/110.01 |
| 5,426,450 | 6/1995 | Drumm ............................. 345/168 |
| 5,442,729 | 8/1995 | Kramer et al. ................... 704/271 |
| 5,452,289 | 9/1995 | Sharma et al. .................... 379/93 |
| 5,455,859 | 10/1995 | Gutzmer ........................... 379/442 |
| 5,524,047 | 6/1996 | Brown et al. ...................... 379/93 |
| 5,526,411 | 6/1996 | Krieter ......................... 379/110.01 |
| 5,550,649 | 8/1996 | Wong et al. ...................... 379/100 |
| 5,594,470 | 1/1997 | Meyerson et al. ............... 345/169 |
| 5,619,684 | 4/1997 | Goodwin et al. ................ 395/500 |
| 5,631,745 | 5/1997 | Wong et al. ................. 379/110.01 |
| 5,675,390 | 10/1997 | Schindler et al. ................ 348/552 |

Primary Examiner—Scott L. Weaver
Attorney, Agent, or Firm—Greenberg Traurig LLP

[57] ABSTRACT

A computer peripheral device for voice and synthesized voice communication is disclosed. The device serves in place of a telephone handset, in a telephone mode of operation, and as a remote-control computer-based media center in a voice control mode of operation, without requiring the use of headphones. Thus the device frees integrated multimedia and voice-command computer control operations from the physical limitations of the workstation, with its keyboard and CRT. The device also integrates telephone communication functions, including caller ID into a computer remote control interface, thereby providing modal flexibility, minimizing disruption and increasing operator efficiency.

15 Claims, 4 Drawing Sheets

COMPUTER COMMUNICATIONS DEVICE

This a division application Ser. No. of 08/928,890 filed Sep. 12, 1997 now U.S. Pat. No. 5,787,152, which is a continuation of application Ser. No. 08/503,590 filed Jul. 18, 1995, now abandoned.

BACKGROUND OF THE INVENTION

1. Field of the Invention

This invention generally relates to communication devices. More particularly, the invention relates to devices that provide full-duplex communication and to devices that provide remote control of personal computers.

2. Description of the Related Art

It is well-known that, in full-duplex communications operations such as normal telephone conversations, it is important to either physically separate an audio input device from audio output as much as possible or to provide an earpiece so that a lower output volume level can be used, as in the conventional telephone handset. This prevents acoustic feedback from being conducted by the structure of the housing.

Also, in full-duplex communications operations that do not use an earpiece, it is important to control the phase and directional relationships between audio input and audio output transducers, the speaker and the microphone, to prevent the sort of feedback that produces the squeals heard from improperly-used public address systems.

Conventional audio transducers for multimedia computers are mounted together below the computer monitor screen inside the screen enclosure, or in a separate audio enclosure resting on top of the screen enclosure, with the microphone between two speakers. All three transducer apertures are aligned on a flat surface facing the operator. Thus the conventional, screen-mounted microphone is subjected to structural conduction and will receive acoustic feedback that varies in phase and volume depending on the nature of the reflective surface opposite those speakers and its distance from the microphone, as is well known.

In particular, feedback is readily conducted by the respective enclosure because of the close proximity of these transducers to each other. Speaker sound is also readily reflected by opposing surfaces with little attenuation because of the speakers' proximity to the microphone and because all apertures in these units face in the same direction. Moreover the placement of the three audio transducer apertures in the flat, vertical front face of a conventional enclosure does nothing to shield the input transducer from such reflections.

Mounting a microphone on the computer screen enclosure in this conventional way is particularly problematic when computer voice command control is in use. Feedback and noise interfere with productivity in voice-command computer control operations because they reduce the accuracy of the computer's command recognition operations, thus reducing its speed.

Efficient voice communication, and voice-command computer control in particular, has three principal requirements:

1) A constant distance between the microphone and the person speaking, preferably a close proximity.
2) Shielding of the microphone from other voices and other extraneous noise.
3) Feedback prevention.

The first requirement assures an adequate input volume level. This level decreases rapidly as this person moves away, in accordance with the inverse-squares' law. Locating the microphone in close proximity to the person speaking also assures the best possible signal-to-noise ratio for accurate voice recognition. However, conventional computer audio equipment meets this requirement by immobilizing the operators in front of the computer screen when they use voice-command computer control, chaining them to their chairs. This, in itself, interferes with the workstation's productivity.

The second requirement is simply ignored in the design of the conventional computer audio inputs noted above. Mounting the microphone on a flat surface above or below the computer screen, provides little or no shielding from either ambient noise or reflected speaker sound.

The third requirement is often met by providing only half-duplex audio communication, speaker-phones' artificial alternation between providing audio output and accepting audio input. In human communication, this is disruptive and annoying.

Apart from voice recognition problems, operator efficiency is also hindered by lack of inter-modal coordination and flexibility. Real-time on-line communications activity, in general, is increasing rapidly. The computers themselves have become digital communications hubs connected by modem to telephone lines for facsimile transmissions, electronic mail and information exchanges between data banks. They are also increasingly used to access multimedia resources and process audio and video inputs.

Computers are no longer just off-line number-crunching or wordprocessing appliances. Nor is the operator dependent upon an alphanumeric keyboard and CRT for control of and responses from the computer. However, the complex interaction of these new functions demands more spatial and modal flexibility for the computer operator. In particular, an improved audio link is needed to prevent the attendant increases in functional complexity from interfering with workstation productivity.

For example, computer operators are hindered when their computer work is interrupted by telephone calls. They must locate the ringing telephone, perhaps digging it out from beneath the working papers accumulating on the desk, and pick up its handset to answer the call. This diverts them from the computer screen. "Hands-free" telephone equipment may simplify that process, but half-duplex speaker-phone operations interfere with normal conversation and people who are not employed full-time as telephone operators find headsets annoying.

Moreover, voice synthesis can completely free computer operators from their dependence on the CRT for monitoring the computer's operations, but conventional voice-command hardware immobilizes them in front of that CRT. This new, additional lack of mobility interferes with the operators' access to the physical resources available to them just as surely as the old CRT and keyboard interface did. This severely limits the potential usefulness of voice synthesis in computer control operations.

For these reasons, the conventional voice-communications system provided for personal computers is merely a toy. When productivity is at issue, these well-known shortcomings of the conventional computer audio hardware are intolerable.

SUMMARY OF THE INVENTION

The present invention provides a computer workstation having improved audio communications performance.

In particular the present invention provides an audio communications peripheral device for integrated personal computer workstations that facilitates highly-productive multimedia, voice control and voice communications work.

In accordance with the present invention, computer workstation productivity is improved by physically separating the output transducers from the microphone used for full-duplex operation and distributing audio output functions between full-duplex and half-duplex output transducers.

The present invention permits the same telephone line connected to a computer for transmitting facsimile messages, electronic mail and other digital data, to be used to transmit voice signals. This functional integration allows computer operators to answer telephone calls without leaving the computer workstation.

Voice-command control operations are also improved because the portable microphone can be conveniently moved to maintain an advantageous predetermined distance from the operator on the table, desk, etc. where the operator is working.

In addition to permitting the operator much greater freedom of movement, the act of resting the portable microphone on the table effectively shields the computer's audio input. This shielding provided by the orthagonal orientation of applicant's microphone aperture to the conventional speaker apertures, permits full-duplex operation and minimizes direct interference from ambient noise sources.

Also, when the device is placed on the table in front of the operator, the microphone's distance from the speakers is increased without sacrificing its proximity to the operator, thereby reducing not only reflected but also conducted feedback.

In accordance with a preferred embodiment of the present invention the device also provides a remote control interface. When using this device in the remote control device, the operator enjoys substantial independence from the operator's conventional CRT/keyboard control interface.

A communications device in accordance with the present invention includes a housing accessible to a human operator, said housing having means for converting sounds spoken by the operator into outgoing voice signals, and means for converting incoming voice signals into sounds heard by the operator in said housing. The device also includes an interface operatively connected to said means for converting incoming and outgoing voice signals, to the computer and to the telephone line, as well as control means for conducting said outgoing and incoming voice signals to and from the telephone line in a telephone mode of operation in which the housing serves in place of a telephone handset, and for conducting the outgoing and incoming voice signals to and from the computer in a voice-command mode of operation in which the housing serves as a computer control center.

In the telephone mode of operation, the operator can select either audible or inaudible notification of an incoming telephone call while working on the computer. Audible notice is provided by the computer, the communications device or a conventional telephone ringing circuit. Alternatively, in voice-command mode for example, silent notice is provided by displaying a visible graphic symbol on the computer screen, such as a flashing telephone icon. Then, in telephone mode for example, operator can also conveniently answer the telephone call by speaking into the microphone in the communications device and hearing the audio output from either the speaker in the device, or an earpiece, without diverting the operator's attention from the monitor. Thus telephone operations are integrated with the computer workstation and the same telephone line that heretofore conducted digital signals to the computer's modem: facsimile messages, electronic mail and data bank information, can be employed for both duplex and half-duplex voice communication.

When the voice-command mode of operation is selected, the communications device functions as a half-duplex computer control center. Words dictated by the operator into the microphone are processed by voice-recognition programs in the computer to provide commands that control the computer and provide data for use by the computer. In a preferred embodiment, this audio remote control mode also provides audible responses from the computer. The computer's response is communicated by voice-synthesis signals to a speaker in the housing, thereby providing an interactive remote control mode that frees the operator from the CRT and keyboard of the conventional computer workstation interface.

BRIEF DESCRIPTION OF THE DRAWINGS

The features and advantages of the present invention will be better understood when detailed description of specific embodiments given below is considered in conjunction with the drawings provided, wherein.

In these figures, like structures are assigned like reference numerals.

DETAILED DESCRIPTION OF THE PREFERRED EMBODIMENTS

Figure 1:
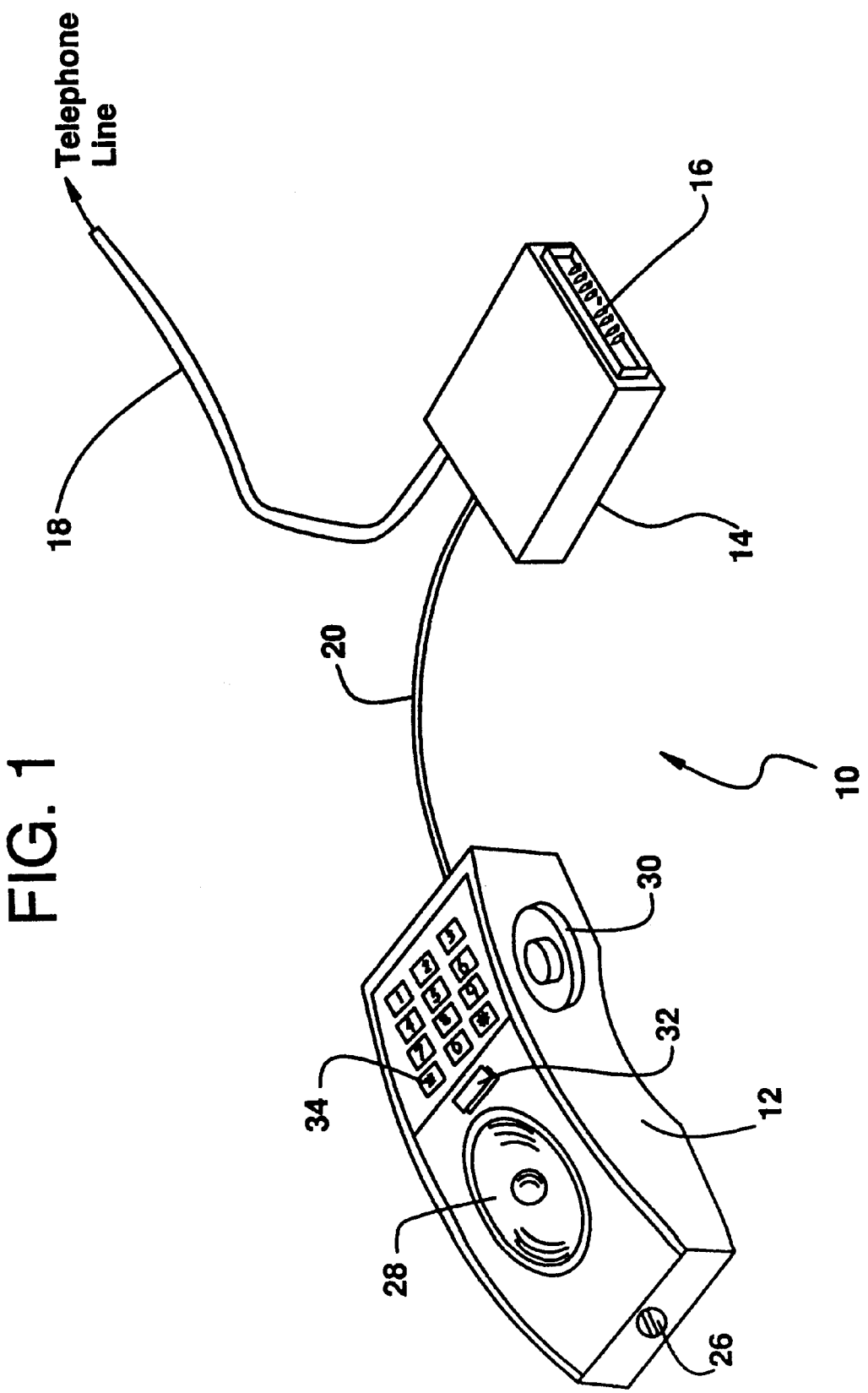
FIG. 1 is a perspective view of a simple computer control and communications device in accordance with the present invention.

Referring now to the drawings, reference numeral 10 generally identifies a communications device including a portable housing 12 and an interface 14. The interface includes an external connector 16, preferably an RS232 connector, for direct connection to a computer, as well as a socket for reception of a plug connected to a telephone line 18. The electronic circuitry of the communications interface 14 is either hard-wired to the housing 12 by a cable 20, as shown in FIG. 2, or is connected by a wireless link between the antennae 22, 24, as shown FIGS. 3 and 4 which are described below.

The housing 12 also includes a microphone 26 that picks up conversation and voice commands, a speaker 28 and a jack 30 for connecting an optional headset for use in environments where privacy is important. The housing also provides a mode control key 32 that selects the mode of operation used by the system, and a standard keypad 34 for placing a telephone call and entering computer control codes.

Figure 2:
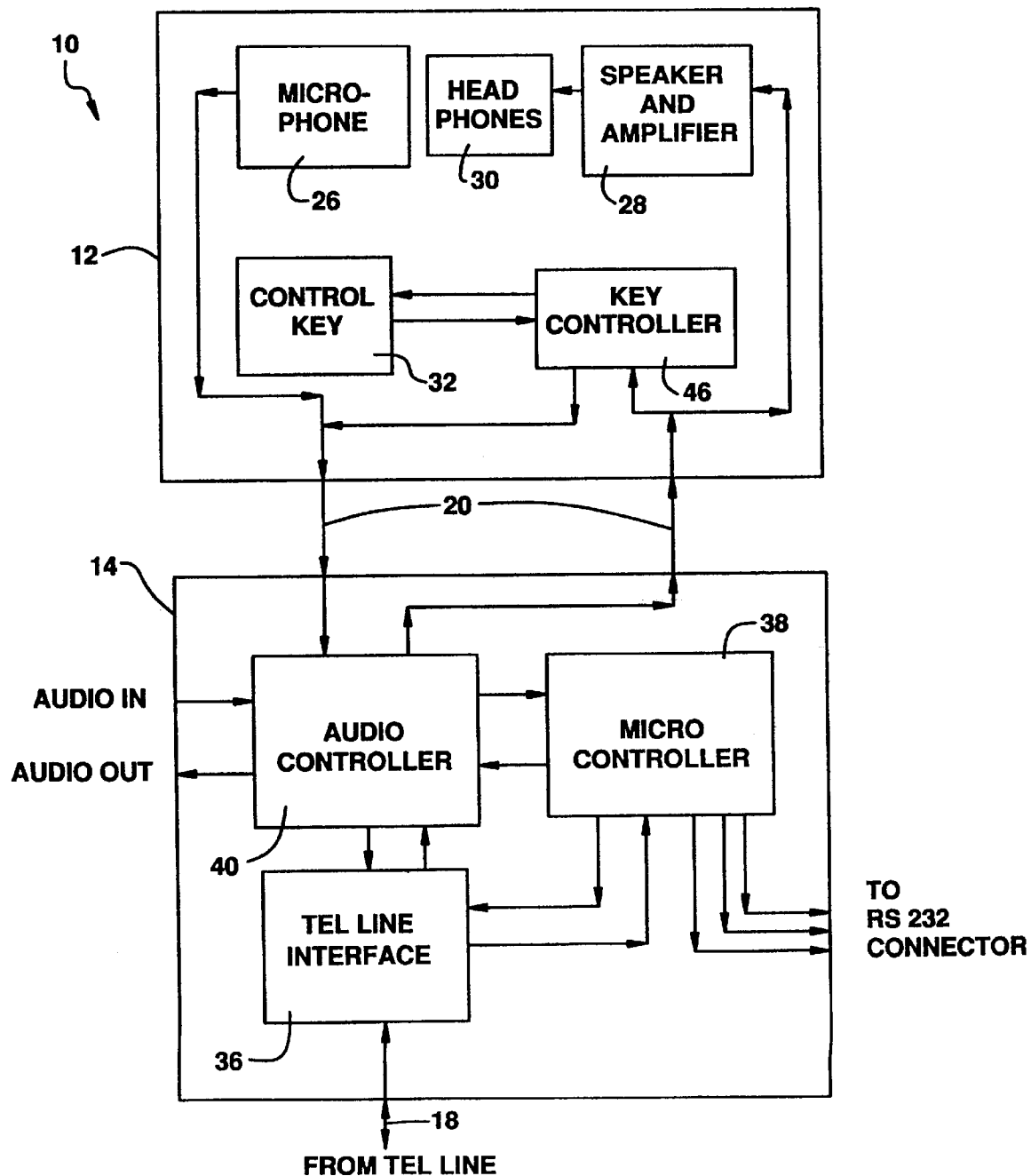
FIG. 2 is a block diagram of the device of FIG. 1 according to one embodiment of this invention.

Turning now to FIG. 2, control circuitry in the interface 14 includes a telephone line interface module 36 where incoming voice signals from the telephone line 18 are digitized and processed. The digitized signals are then conducted to a programmable microprocessor or a microcontroller 38 and to an audio controller 40. The audio controller has auxiliary audio input AUDIO IN and output AUDIO OUT connections that can be used to operate the computer' s speakers (not shown), either a computer sound system or external speakers, and an interface cable connector for the cable 20.

The cable 20 connects the audio controller 40 through an amplifier to the speaker 28 on the housing 12. For full-duplex operation, the audio controller 40 is connected to headphones through the optional headset jack 30 or to the computer's speaker (not shown) through the auxiliary AUDIO IN and AUDIO OUT connections on the audio controller 40. In this embodiment, privacy is assured by simply connecting headphones to the jack 30, which simultaneously causes the audio controller to disconnect the auxiliary AUDIO IN and AUDIO OUT lines.

The operator's voice is picked up by the microphone 26 connected to the audio controller 40 by the cable 20 and, after being digitized and processed, to the microcontroller 38 and the telephone interface module 36. The digitized voice signals are output to the interface connector 16, to the telephone line 18 or to the auxiliary output of the audio controller 40 depending upon the mode of operation selected using the control key 32.

Figure 3:
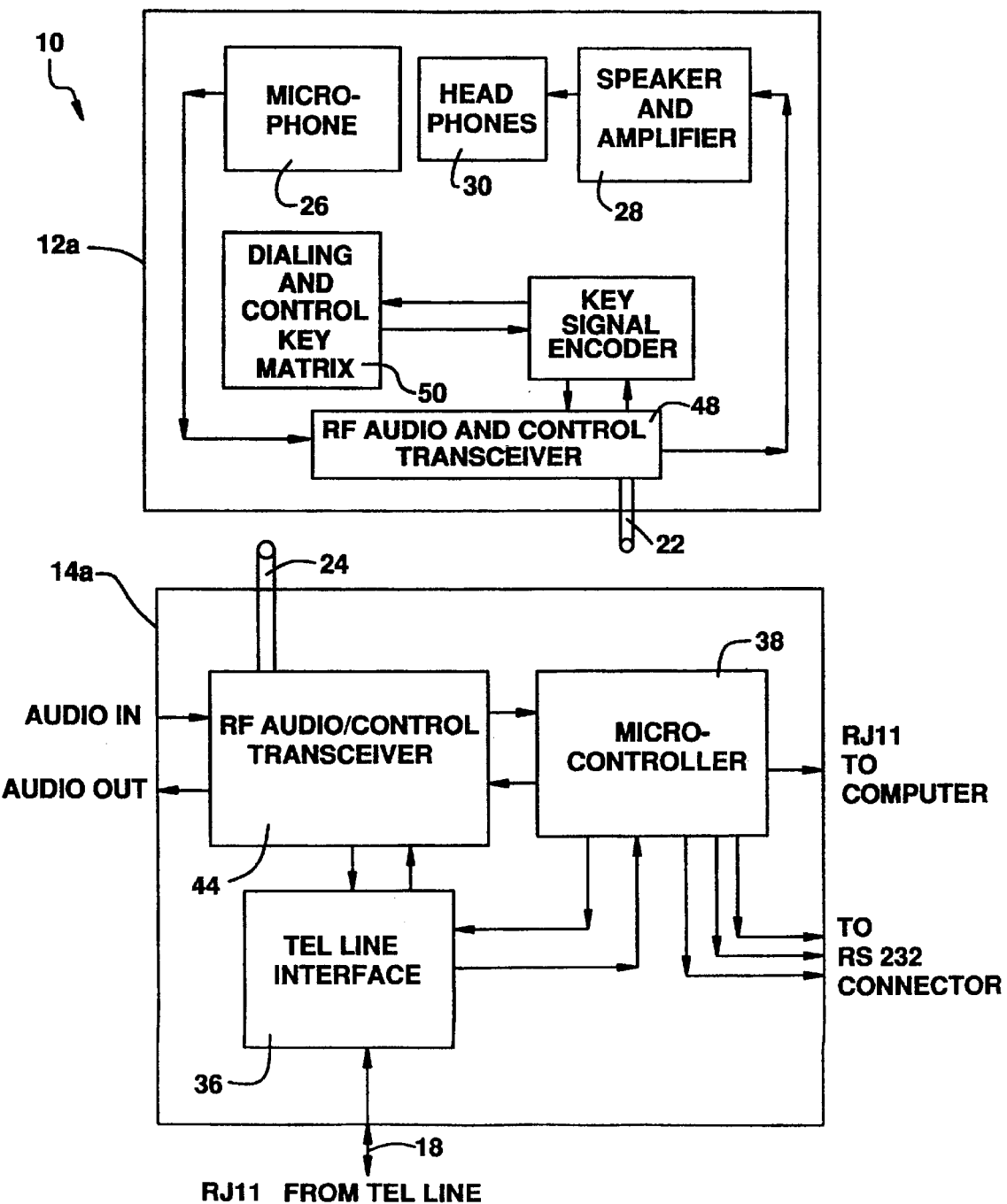
FIG. 3 is a block diagram of the device of FIG. 1 according to another embodiment of this invention.

FIG. 3 shows another embodiment of the circuitry shown in FIG. 2. However, instead of the hard-wired cable 20, a wireless link is provided between the housing 12*a* and the interface 14*a* in a base-station that also serves as a charger for the wireless remote unit. Radio frequency transceivers 48,44 transmit and receive radio frequency signals between antennas 22,24 on the remote 12*a* and interface 14*a*, respectively.

In FIG. 3, the functions of the audio controller 40 in the interface 14*a* of FIG. 2 are provided by the radio frequency transceiver 44 in the interface 14*a*. Also, a key matrix 50 connects the keys of a standard dialing keypad and multiple control keys through a key signal encoder 46 to the radio frequency transceiver 42. Thus, pressing the keys of the matrix sends a signal from the remote unit through the base-station interface 14*a* to the computer (not shown).

Figure 4:
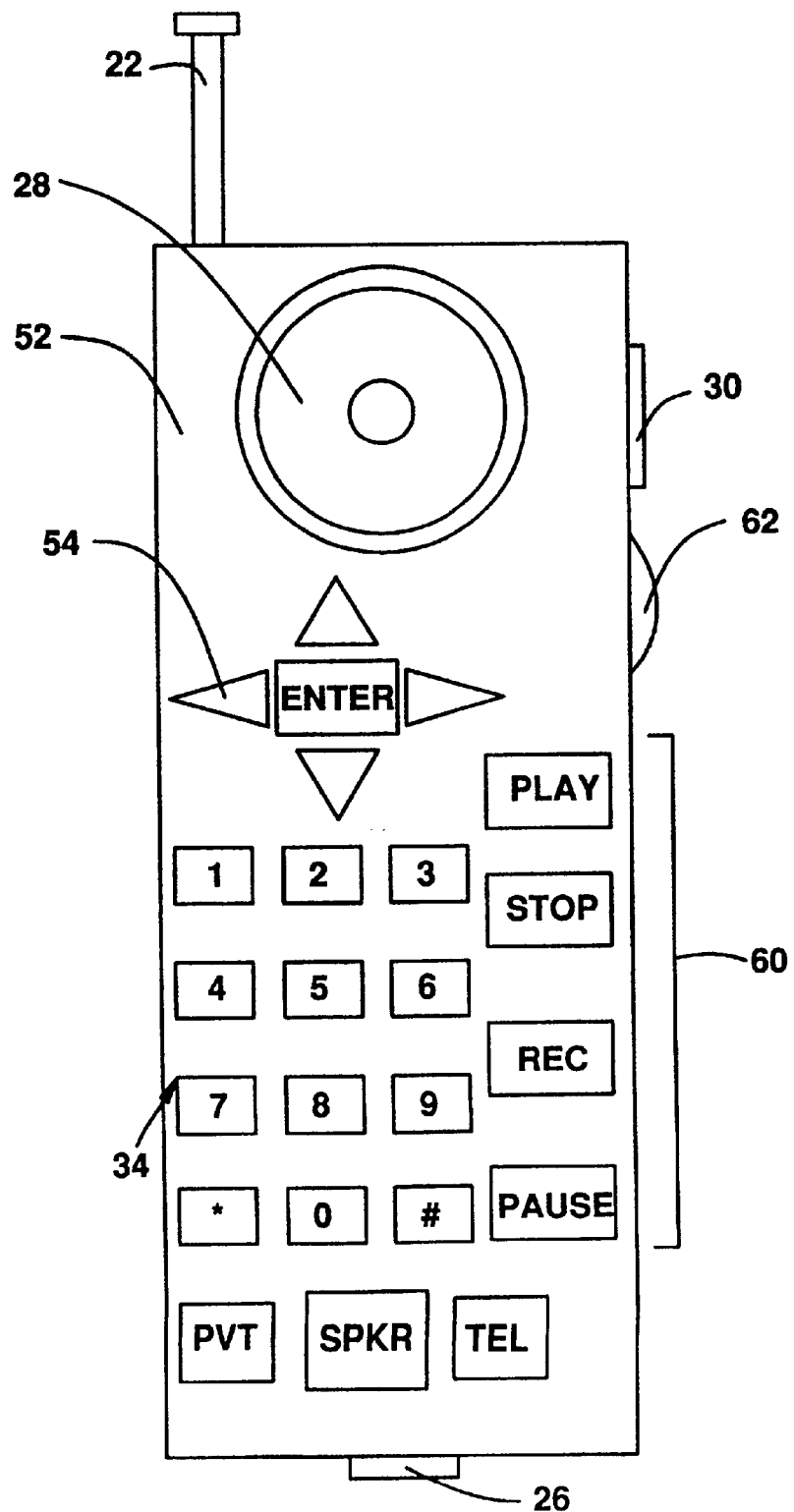
FIG. 4 is a plan view of the keypad provided by the remote unit of the wireless computer access device of FIG. 3.

The housing 52 of the wireless remote control unit is shown in FIG. 4. The key matrix 50 provides a mode control key "TEL" and the standard dialing keypad 34. For remote control, the key matrix also includes cursor keys 54, a speaker control key "SPKR", a privacy key "PVT" and media control keys 60.

The speaker control key permits the operator to mute the computer speakers when operating beyond the speakers' effective range, and the privacy key permits the operator to selectively mute the speaker 28 on the housing 12*a* when an ear piece is in use. The media control keys 60 provide a record function key "REC" and the standard playback control functions: "PLAY", "STOP" and "PAUSE" to remotely operate media devices (not shown) controlled by the computer.

A rotary audio volume control 62 may be provided on the side of the unit to vary the audio output level of the remote speaker 28, the earpiece that the operator plugs into the jack 30, or the computer's speakers (not shown), whichever is in use at the time. In this remote control embodiment the earpiece is an earphone, for convenience, but headphones may be used if remote stereo sound is needed.

In telephone mode, the computer operator is provided with a full-duplex multimedia channel, and can answer calls, using the microphone 26 and speakers (not shown) connected to the auxiliary AUDIO IN and AUDIO OUT connections on the audio controller 40. A remote operator will use an earpiece connected to the jack 30 rather than local, computer speakers connected to the auxiliary AUDIO IN and AUDIO OUT lines. Such outgoing and incoming voice signals are conducted via the telephone line 18, and may be conventional analog signals or ISDN digital audio. Multimedia operations over the auxiliary AUDIO IN and AUDIO OUT connections on the audio controller 40 may include speech-synthesis and audio-recording operations such as voice mail.

In voice control mode, the operator can very simply and very conveniently utilize the microphone 26 and the speaker 28 on the housing 12*a* for half-duplex communication with the computer itself. Alternatively, when an earphone or headphones are already in use for full-duplex multimedia or telephone communications, the jack 30 can be used to provide all audio output, as a matter of convenience.

In remote control operations, the speaker 28 on the housing 12*a* is used for digitally-synthesized voice output when the computer control mode is selected by the operator using the control key 32. The cursor keys 54 can be used to access functions that are identified by a synthetic-voice statement and would otherwise be located in a matrix on the screen. The stated function is then selected by pressing the "ENTER" key in the center of the cursor keys 54.

In the remote telephone operations, when the auxiliary speakers are muted, the computer's synthesized voice output through the speaker 28 also announces caller ID, preferably including a caller name that is associated with that caller ID number in the computer's data base, information that would otherwise be available on the computer screen.

The present invention is in no way limited to the presently preferred embodiments of the described above. It will immediately apparent to one skilled in the art that variations and modifications of the disclosed embodiments are possible without departing from the spirit and scope of the present invention. The invention is defined by the appended claims.

I claim:

1. A communications device for a computer connected to a telephone line, said device comprising:

a) a housing accessible to a human operator, said housing having means for converting words uttered by the operator into outgoing voice signals, means for converting incoming voice signals into words audible to the operator, and a plurality of manually actuated keys;

b) an interface operatively connected to the housing, the computer and the telephone line; and c) control means for conducting said outgoing and incoming voice signals to and from the telephone line in a telephone mode of operation in which the housing serves as a telephone handset, and for conducting the outgoing and incoming voice signals to and from the computer in an voice control mode of operation in which the housing serves as a computer control center, said housing having means for selecting one of said modes of operation.

2. The device according to claim 1, wherein the means for converting the incoming voice signals includes a speaker and an earpiece; and said housing further comprising output selection means for selecting one of said speaker and said earpiece.

3. The device according to claim 1 wherein said output selection means is a jack that supersedes the speaker on the housing when an earpiece is plugged into said jack.

4. The device according to claim 1, wherein the interface is connected to the housing by a conductive cable.

5. The device according to claim 1, wherein the housing and the interface each includes a radio frequency transceiver, and wherein the interface is connected to the housing via a wireless, radio frequency link.

6. The device according to claim 1, wherein the interface has an RS232 connector for direct connection to the computer.

7. The device according to claim 1, wherein the housing is a lightweight, portable unit movable relative to the computer.

8. The device according to claim 7, wherein the housing includes:

a keyboard having multiple actuatable keys;

a support surface opposite to a surface of said housing on which said keyboard is located, said support surface providing support for the keyboard when the housing is placed on a flat surface; and a microphone aperture in an oblique surface of said housing, said oblique surface being substantially orthogonal to said support surface.

9. The device according to claim 1, wherein the housing also includes a privacy switch.

10. The device according to claim 1, wherein said keys include media control keys.

11. The device according to claim 1, wherein said keys include cursor control keys.

12. The device according to claim 2, wherein the output selection means includes a speaker selection switch on the housing, said speaker selection switch selectively providing audio output through a speaker on the housing or through a speaker outside said housing.

13. The device according to claim 1, further comprising:

an audio controller for selectively conducting voice-command and telephone audio signals to and from the computer in half-duplex and full-duplex mode, respectively.

14. The device according to claim 1, wherein the computer includes means for converting incoming voice signals into commands for controlling the operation of a computer program while in voice control mode, and means for converting responses of the computer program into outgoing voice signals while in voice control mode.

15. The device according to claim 1, wherein the operation mode selection means comprises a mode control switch disposed on said housing.

\* \* \* \* \*